United States Patent
Chen (10) Patent No.: US 9,734,790 B2
(45) Date of Patent: Aug. 15, 2017

(54) METHOD OF SWITCHING BUTTON FUNCTIONS AND DISPLAY SYSTEM WITH PORTABLE DEVICE APPLYING THE SAME

(71) Applicant: Wistron Corporation, New Taipei (TW)

(72) Inventor: Feng-Yuan Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 7 days.

(21) Appl. No.: 14/919,045

(22) Filed: Oct. 21, 2015

(65) Prior Publication Data

US 2016/0357270 A1 Dec. 8, 2016

(30) Foreign Application Priority Data

Jun. 2, 2015 (TW) .............................. 104117818 A (51) Int. Cl.
 *G09G 5/00* (2006.01)
 *G06F 3/023* (2006.01)
(52) U.S. Cl.
 CPC ........... *G09G 5/003* (2013.01); *G06F 3/0238* (2013.01); *G08C 2201/20* (2013.01); *G08C 2201/21* (2013.01)
(58) Field of Classification Search
 CPC ...... G06F 3/023; G06F 3/0238; G06F 3/1454; G09G 5/003; G09G 5/001; G09G 2354/00; G09G 2370/06; G09G 2370/16
 See application file for complete search history.

(56) References Cited

U.S. PATENT DOCUMENTS

2011/0043326 A1* 2/2011 Lee .................... H04N 7/163
                                                                  340/5.8

FOREIGN PATENT DOCUMENTS

| CN | 101489025 | * | 7/2009 |
| CN | 101489025 | A | 7/2009 |
| CN | 102316210 | A | 1/2012 |
| CN | 102984568 | A | 3/2013 |

OTHER PUBLICATIONS

Taiwanese Office Action dated Jun. 15, 2016 corresponding to application No. 104117818, and its English translation, pp. 1-10.

* cited by examiner

*Primary Examiner* — Md Saiful A Siddiqui
(74) *Attorney, Agent, or Firm* — Muncy, Geissler, Olds & Lowe, P.C.

(57) ABSTRACT

A method of switching button functions is disclosed. The method is used for switching the functions of buttons used to operate a display when the portable device is connected to the display. The method includes the following steps of: detecting whether the portable device is connected to the display; if yes, determining whether the functions of the buttons can be switched according to whether a button information is received; if yes, pairing each of the buttons with functions provided by the portable device; and storing a pairing information of each of the buttons and the functions provided by the portable device.

22 Claims, 8 Drawing Sheets

| | B1 | B2 | B3 | B4 | B5 |
|---|---|---|---|---|---|
| button identification data | 53H | 55H | 57H | 59H | 61H |
| button position data | (0,0) | (1,0) | (2,0) | (3,0) | (4,0) |
| function | Home | Back | Next | Scroll Up | Scroll Down |

|  | B1 | B2 | B3 | B4 | B5 |
|---|---|---|---|---|---|
| button identification data | 53H | 55H | 57H | 59H | 61H |
| button position data | (0,0) | (0,1) | (0,2) | (0,3) | (0,4) |
| function | Play/Pause | Previous | Next | Volume Up | Volume Down |

| | B1 | B2 | B3 | B4 | B5 | B6 | B7 | B8 | B9 | B10 | B11 | B12 |
|---|---|---|---|---|---|---|---|---|---|---|---|---|
| button identification data | 001 | 002 | 003 | 004 | 005 | 006 | 007 | 008 | 009 | 0010 | 0011 | 0012 |
| button position data | (0,0) | (0,1) | (0,2) | (0,3) | (1,0) | (1,1) | (1,2) | (1,3) | (2,0) | (2,1) | (2,2) | (2,3) |
| function | Play/Pause | Next | Previous | Volume Up | Volume Down | Continuous Play | Random Play | Stop | Mute | NONE | NONE | NONE |

FIG.8

METHOD OF SWITCHING BUTTON FUNCTIONS AND DISPLAY SYSTEM WITH PORTABLE DEVICE APPLYING THE SAME

BACKGROUND OF THE INVENTION

1. Field of the Invention

The present invention relates to a method of switching button functions, and particularly to a method of switching the functions of buttons used for operating a display when a portable device is electrically connected to the display.

2. Description of the Related Art

With the evolution of wireless network communication technology and constant innovation of handheld devices, handheld devices such as smart phones or tablet computers have become ubiquitous in daily life. Such handheld devices are gradually replacing traditional desktop computers and even laptop computers as platforms for live entertainment or work functions.

However, to make handheld devices easily portable, the highest guiding principle and objective when manufacturers design such products is that they must be "thin and compact". Accordingly, the screens of these products are likely to be small. As compared to that of a large screen of a traditional desktop computer, the visual effect of watching media content on a portable screen is inadequate, especially in terms of watching motion pictures. In order to solve the above-mentioned defect, therefore, the industry has developed the Mobile High-Definition Link (MHL) technology, by which a handheld device can transfer images to a large screen synchronously.

However, in the application of the aforementioned technology at present, after a handheld device is electrically connected to a display, a user may not be able to use the buttons on the display or a remote control of the display to control the handheld device. Consequently, if the user wants to adjust/operate the output generated by the handheld device displayed on the display while viewing the image, the user needs to pick up the handheld device to operate it. If the handheld device is placed far from the display, this may cause considerable inconvenience for the user.

Accordingly, there is indeed a need to provide a solution which allows a user to directly manipulate a handheld device by means of buttons on a display after the handheld device is electrically connected to the display.

SUMMARY OF THE INVENTION

It is a major objective of the present invention to provide a method of switching display button functions when a portable device is connected to the display, a portable device applying the same, and the display.

To achieve the objective described above, the method of switching button functions of the present invention is used for switching a function of at least one button used to operate a display when a portable device is signal-connected to the display. The method of switching button functions of the present invention includes the following steps of: detecting whether the portable device is signal-connected to the display; if yes, determining whether the function of the at least one button can be switched according to whether a button information is received; if yes, pairing the at least one button with an operable function provided by the portable device; and storing a pairing information of the at least one button and the operable function provided by the portable device. Accordingly, when the control command generated by the at least one button being pressed is sent to the portable device, the portable device performs the function paired with the at least one button according to the control command and the pairing information.

The portable device of the present invention can be used to switch a function of at least one button used to operate a display when the portable device is signal-connected to the display. The portable device of the present invention includes memory, a communication module, and a processing unit. The communication module is used for connecting with the display. The processing unit is electrically connected to the memory and the communication module; the processing unit is used to determine whether the communication module is signal-connected to the display, and whether the function of the at least one button can be switched according to whether a button information is received when the communication module is signal-connected to the display; when it is determined that the function of the at least one button can be switched, the processing unit is used for pairing the at least one button with an operable function provided by the portable device and, after the pairing is completed, storing a pairing information of the at least one button and the operable function provided by the portable device into the memory.

The present invention further provides a display which can be signal-connected to a portable device and controlled by at least one button, the portable device is used for pairing the at least one button with an operable function provided by the portable device when the portable device is signal-connected to the display to set a pairing information of the at least one button and the operable function provided by the portable device. The display of the present invention includes a display unit, a communication interface, and a control unit. The communication interface is used to signal-connect to the portable device. The control unit is signal-connected to the at least one button, the display unit, and the communication interface, and has a first control state and a second control state; when the control unit is in the first control state, a control command generated by the at least one button is used for adjusting the output of the display unit; when the control unit is in the second state, the control command generated by the at least one button is sent to the portable device, such that the portable device performs the operable function provided by the portable device and paired with the at least one button according to the control command and the pairing information.

DETAILED DESCRIPTION OF THE PREFERRED EMBODIMENT

Hereafter, the technical content of the present invention will be better understood with reference to preferred embodiments.

Figure 1:
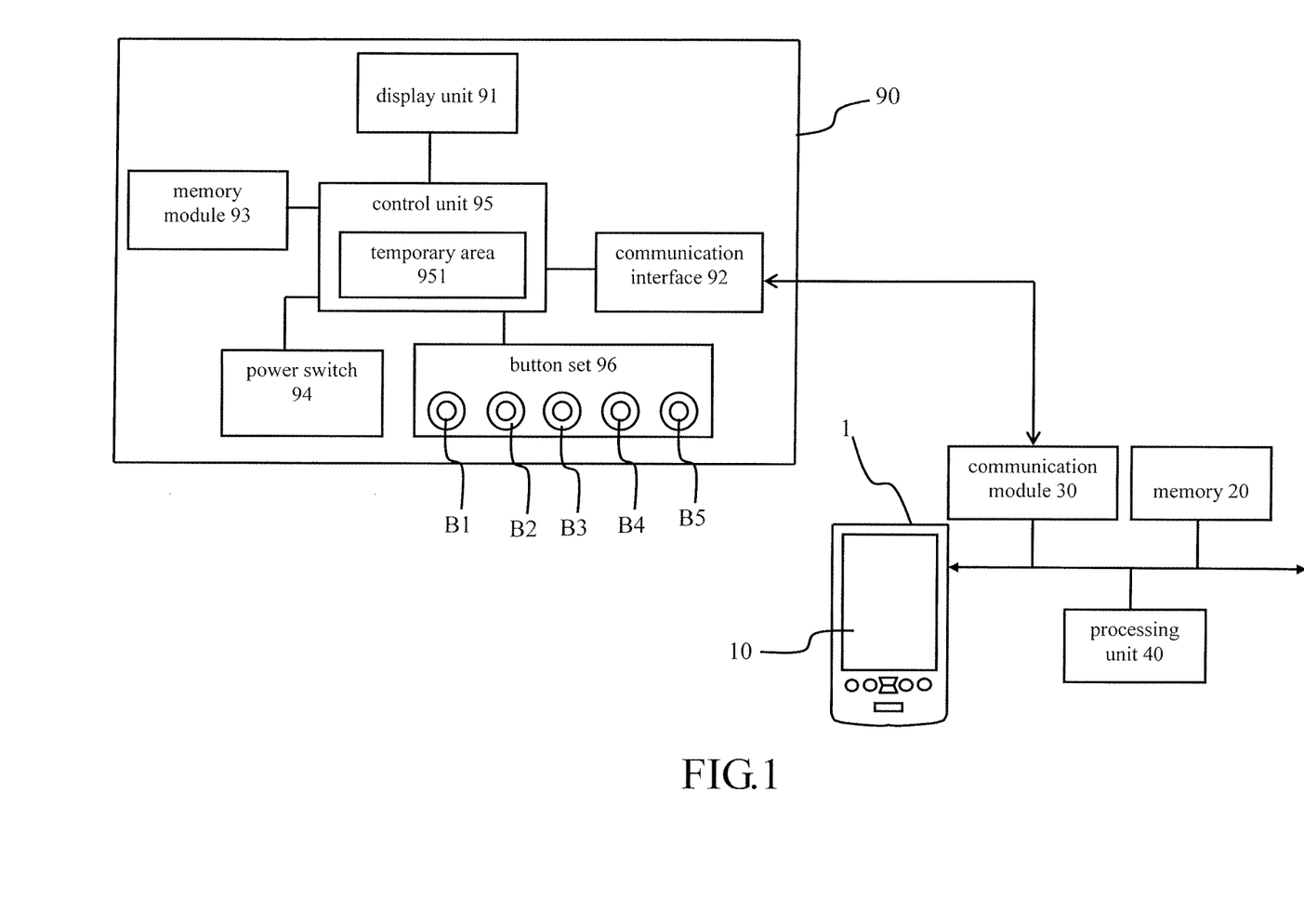
FIG. 1 is an architecture diagram of a portable device according to a first embodiment of the present invention.

Please first refer to FIG. 1, which is an architecture diagram of a portable device according to a first embodiment of the present invention.

As shown in FIG. 1, in the first embodiment of the present invention, the portable device 1 of the present invention can be signal-connected to a display 90, wherein the display 90 includes a display unit 91, a communication interface 92, a memory module 93, a power switch 94, a control unit 95 and a button set 96 having a plurality of buttons B1-B5 for operating the display 90. In a specific embodiment of the present invention, the display 90 is a large LCD, plasma TV or computer screen, and the portable device 1 is a smart phone, but the present invention is not limited thereto. The portable device 1 may also be a laptop, tablet computer, or other similar portable or wearable electronic products.

The display unit 91, such as an image processing chip, is used to output and display video images. The communication interface 92 is used to signal-connect to the portable device 1. In a specific embodiment of the present invention, the communication interface 92 is an MHL (Mobile High-Definition Link) interface, but the present invention is not limited thereto. The portable device 1 of the present invention may also be signal-connected to the display 90 via wireless communication (e.g., Miracast or other equivalent to WiFi or LAN function).

The memory module 93 is used to record function information of the display 90, such as the resolution, supported pixel size, and manufacturer. The power switch 94 is provided for users to turn on/off the display 90. The control unit 95 is signal-connected to the display unit 91, the communication interface 92, the memory module 93, the power switch 94 and the button set 96. The control unit 95 includes a temporary area 951 used to record a temporary data so that the control unit 95 is able to perform a first control state or a second control state according to the temporary data recorded in the temporary area 951. Specifically, in the present embodiment, when the temporary data recorded in the temporary area 951 is 0, the control unit 95 can perform the first control state; when the temporary data is 1, the control unit 95 can perform the second control state. In other words, the control unit 95 of the display 90 of the present invention has a first control state and a second control state. When the control unit 95 is in the first control state, control commands generated by each of the buttons B1-B5 are used for adjusting the output of the display unit 10, such as adjusting the images of the output (i.e., channel switching) and the brightness or color of the images being output. When the display 90 is signal-connected to the portable device 1, and the control unit 95 is in the second state, the control commands generated by each of the buttons B1-B5 are sent to the portable device 1, such that the portable device 1 can execute corresponding control according to the control commands. The control functions that can be performed by the portable device 1 according to each of the control commands will be described in more detail below. In the embodiment of the present invention, the buttons B1-B5 of the button set 96 are physical buttons, but the present invention is not limited thereto.

In the first embodiment of the present invention, the portable device 1 of the present invention includes a screen 10, a memory 20, a communication module 30, and a processing unit 40. The memory 20 stores a plurality of application programs (e.g., a browser, video player software, and word processing tool, not shown). The communication module 30 is used to connect to the communication interface 92 so that the portable device 1 is signal-connected to the display 90; in a specific embodiment of the present invention, the communication module 30 is an MHL (Mobile High-Definition Link) interface, but the present invention is not limited thereto (e.g., it may be the aforementioned Miracast interface). The processing unit 40, such as a Central Processing Unit, is electrically connected to the screen 10, the memory 20, and the communication module 30. The processing unit 40 is used to perform operations related to the method of switching button functions of the present invention (described in detail hereinafter).

Figure 2:
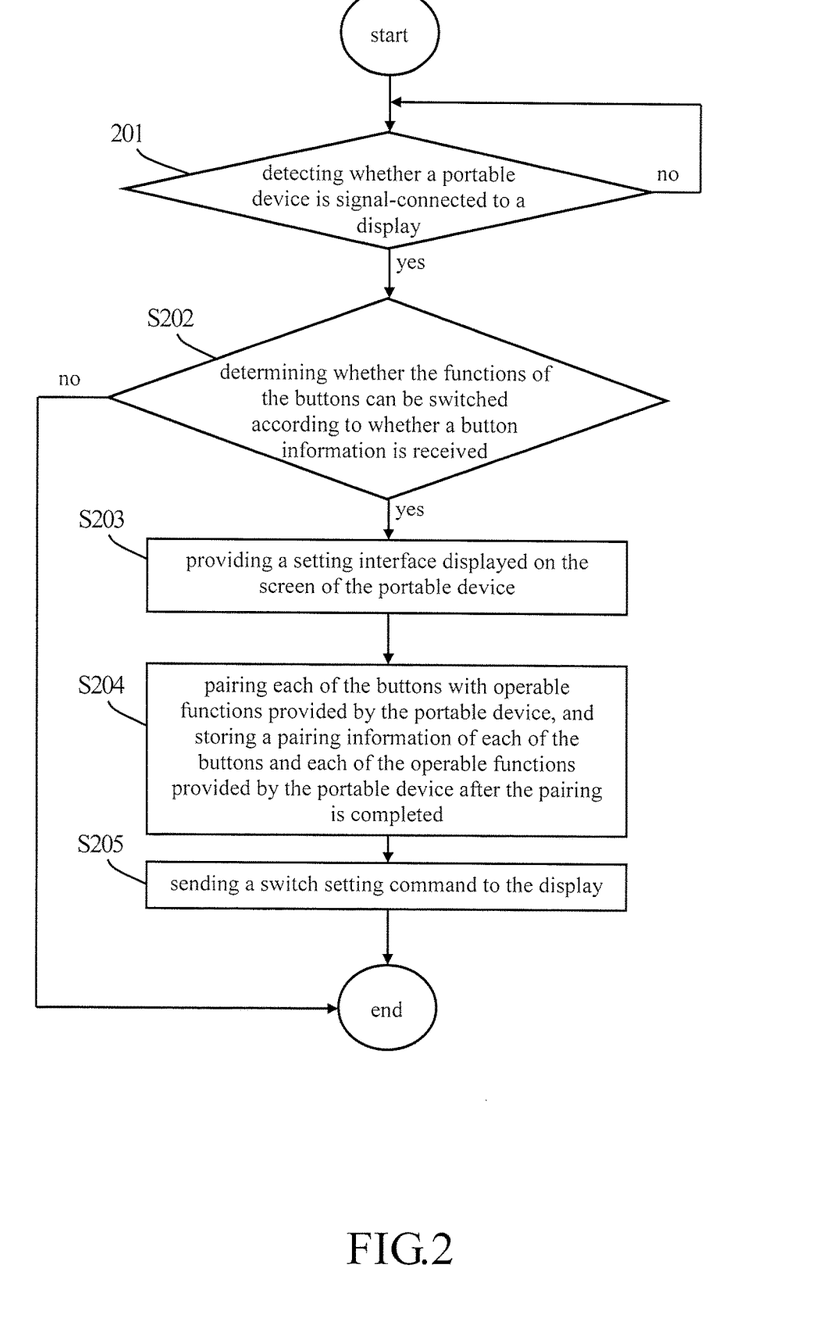
FIG. 2 is a flowchart showing a method of switching button functions according to the first embodiment of the present invention.

Now, please also refer to FIG. 1 to FIG. 4B, wherein FIG. 2 is a flowchart showing a method of switching button functions according to the first embodiment of the present invention. The steps shown in FIG. 2 will be described in sequence in conjunction with FIG. 1 and FIG. 3A to FIG. 4B. However, it should be noted that although the aforementioned portable device 1 is described as an example hereinafter to explain the method of switching button functions disclosed in the present invention, the method of switching button functions of the present invention shall not be limited to the aforementioned portable device 1.

First, in step S201: detecting whether a portable device is signal-connected to a display.

As shown in FIG. 1 and FIG. 2, the method of switching button functions of the present invention is used for switching the functions of the buttons B1-B5 used to operate the display 90 according to operable functions provided by the portable device 1 when the portable device 1 is signal-connected to the display 90. Accordingly, the first step according to the method of switching button functions of the present invention is to detect whether the portable device 1 is signal-connected to the display 90 through connection of the communication module 30 and the communication interface 92 by the processing unit 40.

Then, in step S202: determining whether the functions of the buttons can be switched according to whether a button information is received.

In the first embodiment of the present invention, when the portable device 1 is signal-connected to the display 90, the display 90 can send a function information stored in the memory module 94 to the portable device 1 through the connection between the communication interface 92 and the communication module 30. Specifically, if the display 90 supports switching of the button functions, the function information sent will include button information for each of the buttons B1-B5. Accordingly, when the processing unit 40 receives the function information and accesses the button information from the function information, the processing unit 40 can determine the display 90 supports switching of the button functions. Conversely, if the display 90 does not support switching of the button functions, the function information sent by the display will not include the button information. Therefore, if the processing unit 40 has received the function information but not the button information, it is determined by the processing unit 40 that the display 90 does not support switching of the button functions.

Figure 3A:
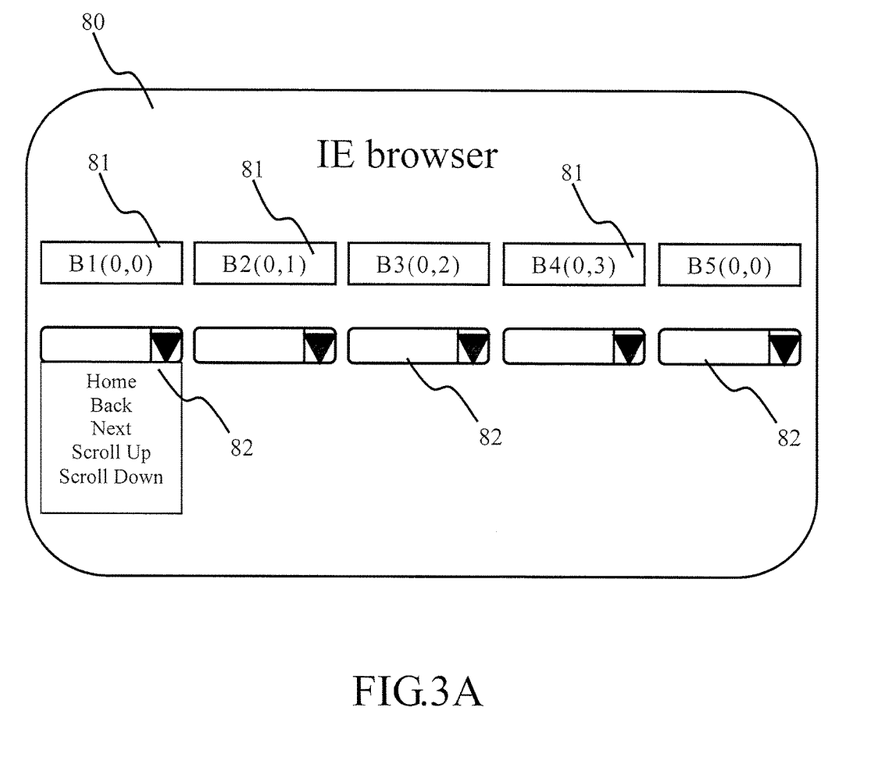
FIG. 3A shows a setting interface according to an embodiment.
Figure 3B:
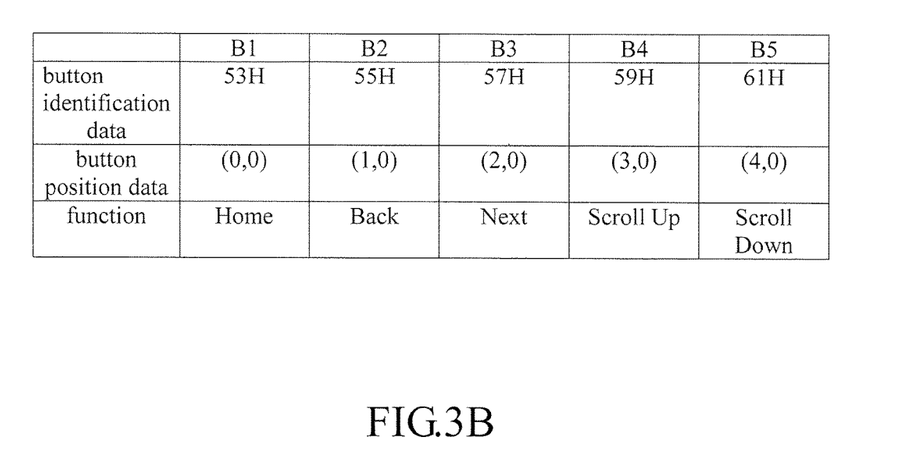
FIG. 3B shows a pairing information of control buttons and functions provided by a browser.

As shown in FIG. 3B, in an embodiment of the present invention, the button information includes a button identification data and a button location data. The button identification data is unique codes of the buttons B1-B5. The button identification data are different from each other. For example, the button set 96 shown in FIG. 1 includes five buttons. The button identification data for each of the five buttons B1-B5 are 53H, 55H, 57H, 59H, and 61H, respectively. The button location data represent the relative positions of each of the buttons B1-B5 on the display 90. In the display 90 shown in FIG. 1, for example, each of the buttons B1-B5 is arranged in a straight line and the line is parallel to a long axis of the display, so the button location data can be defined as (0,0), (1,0), (2,0), (3,0), and (4,0), respectively.

In step S203: providing a setting interface displayed on the screen of the portable device.

Figure 4A:
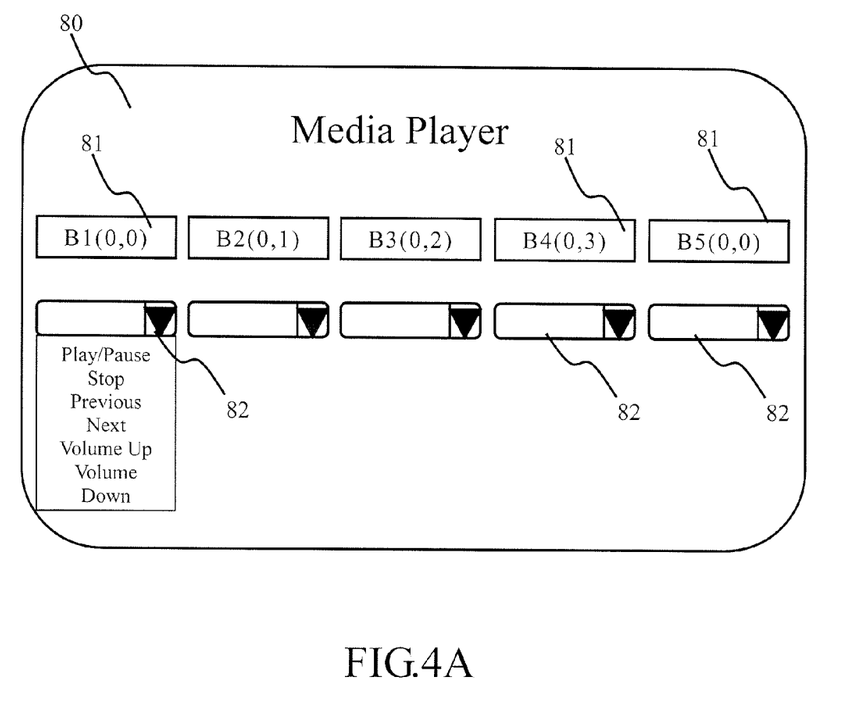
FIG. 4A shows a setting interface according to another embodiment.

When it is determined that the display 90 which is signal-connected to the portable device 1 supports switching of the button functions—that is, that the functions of the buttons B1-B5 can be switched—the processing unit 40 further provides a setting interface 80, as shown in FIG. 3A or FIG. 4A, displayed on the screen 10 of the portable device 1 for a user to select a switched function of each of the buttons B1-B5.

As shown in FIG. 3A, in the first embodiment of the present invention, since the number of the buttons B1-B5 is five, the displayed setting interface 80 includes button item information 81 of the five buttons B1-B5 and function menus 82 corresponding to the button item information 81 of each of the buttons B1-B5, respectively. The button item information 81 shows the name of each of the buttons B1-B5 and the button location data related to each of the buttons B1-B5. Specifically, the button location data is provided for a user to identify the positions of each of the buttons B1-B5 when the user selects pairing information. After the user respectively selects one of the functions in each of the function menus 82 to pair the button item information 81 corresponding to each of the buttons B1-B5, the switched functions of each of the buttons B1-B5 are set. It should be noted that the function items of each of the function menus 82 depend upon the current operable functions provided by the portable device 1; more specifically, the function items depend upon the operable functions provided by a currently executed application of the portable device 1. For example, a browser generally provides functional operations such as "Home", "Back", "Next", "Scroll up" and "Scroll down". If the portable device 1 is executing the browser application, then at this time, the operable functions currently provided by the portable device 1 will include at least the functions described above. Thus, the function items displayed on each of the function menus 82 will include the functions described above. For another example, as shown in FIG. 4A, the operable functions provided by a media player generally include "Pause/Play", "Stop", "Next", "Previous", "Mute", "Volume Up", "Volume Down", "Random Play", and "Continuous Play". If the portable device 1 is executing the video player, then at this time, the operable functions currently provided by the portable device 1 will include at least the functions described above. Thus, the function items displayed on each of the function menus 82 will include the functions described above. Of course, it is possible that the number of the buttons B1, B2, B3, B4, or B5 is smaller than the number of selectable functions. At this time, the users will need to make their own determinations of which functions to select and which functions not to select.

In step S204: pairing each of the buttons with operable functions provided by the portable device, and storing a pairing information of each of the buttons and each of the operable functions provided by the portable device after the pairing is completed.

Figure 4B:
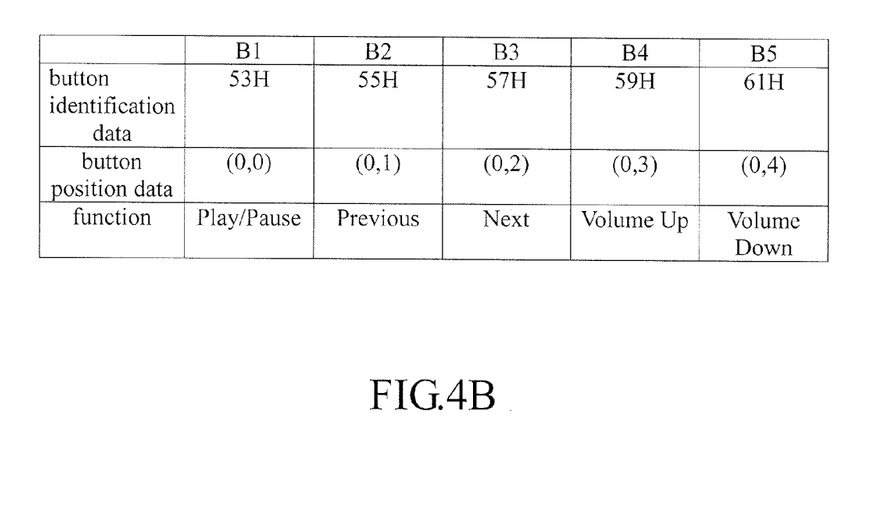
FIG. 4B shows a pairing information of control buttons and functions provided by a video player.

After a user selects a pairing information of each of the buttons B1-B5 and each of the functions that can be currently performed by the portable device 1 through the setting interface 80, the processing unit 40 will pair each of the buttons B1-B5 with each of the functions provided by the portable device 1 and will store the pairing information of each of the buttons B1-B5 with each of the functions provided by the portable device 1 after the pairing is completed. As shown in FIG. 3B, for example, the user pairs the button B1 (the function after switching) with the "Home" function of a browser application, and then pairs the button B2 with the "Back" function of the browser application, and so on. The pairing information will be stored in the memory 40 of the portable device 1. Also, as shown in FIG. 4B, for example, the user pairs the button B1 with the "Stop/Play" function of a media player, and then pairs the button B2 with the "Previous" function of the media player, and so on.

In step S205: sending a switch setting command to the display.

After step S204 is completed, the processing unit 40 then sends a switch setting command to the display 90 to switch the temporary data stored in the temporary area 951 of the control unit 95, such that the control state of the control unit 95 is switched from the first control state to the second control state. More specifically, before the temporary data recorded by the temporary area 951 is changed, the control unit 95 performs the first control state. At this time, a control command generated by a user pressing each of the buttons B1-B5 is used for adjusting the output of the display unit 91. Once step S205 is completed, the control state performed by the control unit 95 is switched from the first control state to the second control state, and then the control command generated by the user pressing each of the buttons B1-B5 is not used for adjusting the output of the display unit 91 but is sent to the portable device 1 by the control unit 95 and received by the processing unit 40. Specifically, the sent control command includes a button identification data of one of the buttons B1-B5 pressed by the user. For example, when the user presses the button B3, a control command generated by the button B3 includes the button identification data with the content of 57H.

After the processing unit 40 of the portable device 1 receives the control command sent by the control unit 95, the processing unit 40 will perform one of the operable functions provided by the portable device 1 and paired with one of the pressed buttons B1-B5 according to the control command and the pairing information of the buttons B1-B5 and the operable functions provided by the portable device 1. For example, as shown in FIG. 4B, if a user presses the button B1 and the control unit 95 is in the second control state when the button is pressed, a control command generated by the button B1 will be sent to the portable device 1. After receiving the control command, the processing unit 40 can determine that the button pressed by the user is the button B1 according to the button identification data of the control command. At this time, the processing unit 40 further performs operations related to controlling the media player to play or pause according to the preset pairing information. In other words, after the above steps are completed, at this time, each of the buttons B1-B5 can be provided for the user to control the portable device 1.

Figure 5:
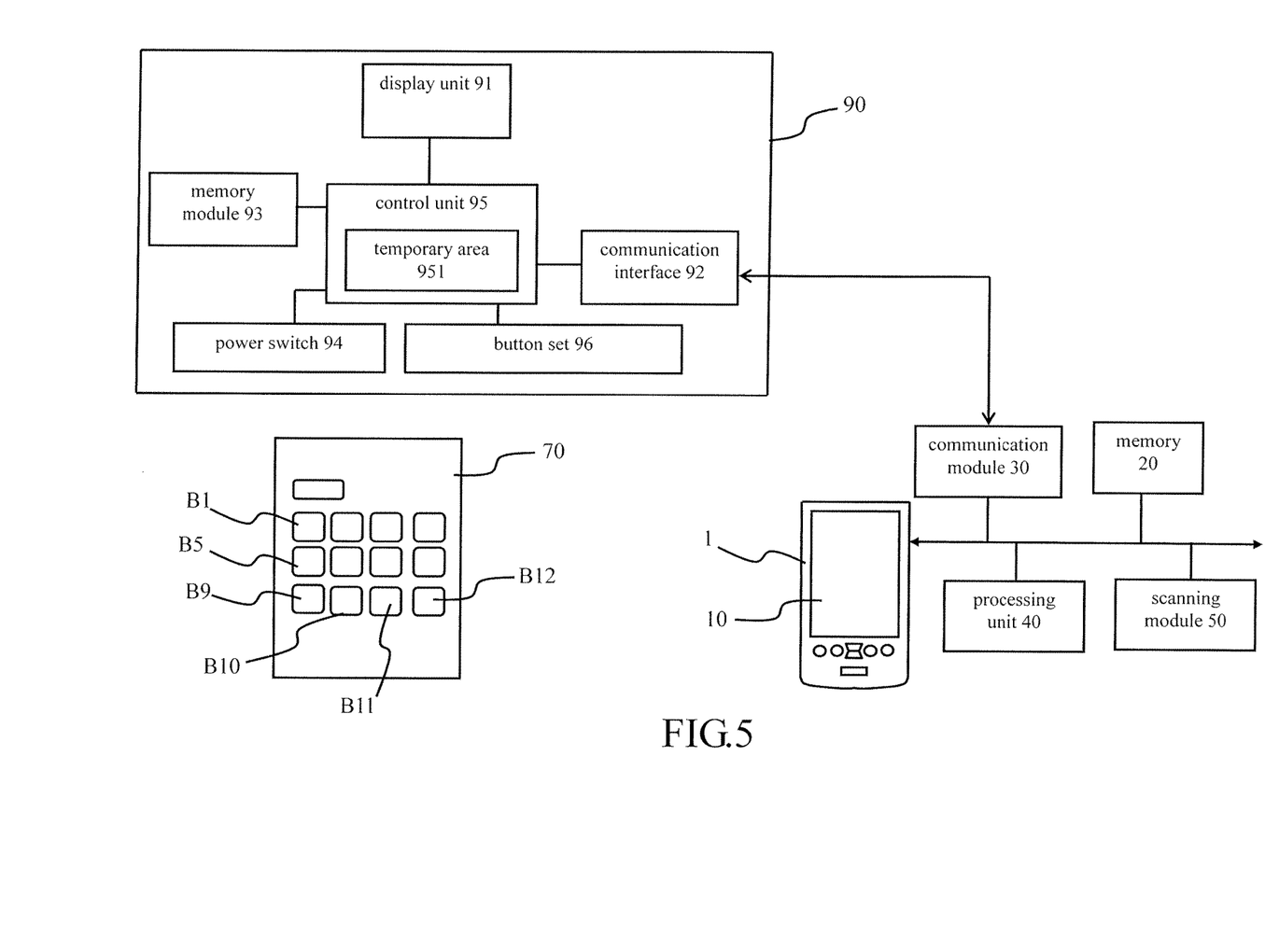
FIG. 5 is an architecture diagram of a portable device according to a second embodiment of the present invention.

Please refer to FIG. 5 for an architecture diagram of a portable device according to a second embodiment of the present invention.

As shown in FIG. 5, the difference between the second embodiment and the aforementioned first embodiment of the present invention is that the buttons B1-B12 used for operating the display 90 (not shown respectively) are on a remote control used for remotely controlling the display 90, wherein the button information of each of the buttons B1-B12 is stored in the memory module 93 of the display 90. When the control unit 95 of the display 90 is in the first control state described above, the user can use the remote control 70 to remotely control the display 90, such as changing channels, adjusting the volume, and adjusting the screen resolution. The implementation of the detailed remote control method belongs to the prior art and is familiar to those skilled in the art, so it will not be repeated herein.

In a second embodiment of the present invention, the portable device 1 includes a screen 10, a memory 20 for storing a plurality of applications, a communication module 30, a processing unit 40, and also a scanning module 50 for scanning a bar code. In a specific embodiment of the present invention, the scanning module 50 is a camera and the bar code is a QR code, but the present invention is not limited thereto. The scanning module 50 may also be an infrared scanner, and the bar code may be a one-dimensional or two-dimensional bar code.

Figure 6:
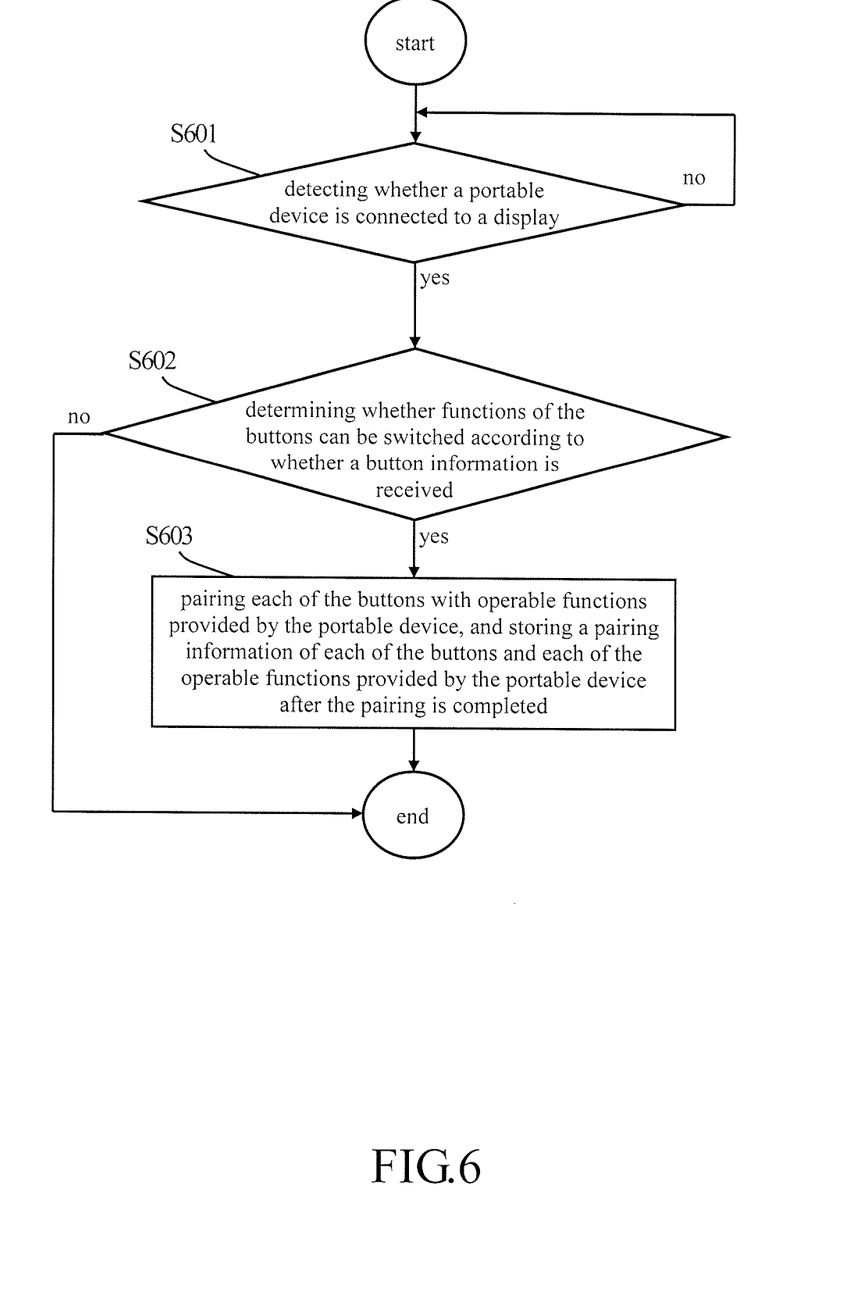
FIG. 6 is a flowchart showing a method of switching button functions according to the second embodiment of the present invention.

Please also refer to FIG. 5 to FIG. 8. Specifically, FIG. 6 is a flowchart showing a method of switching button functions according to the second embodiment of the present invention. The steps shown in FIG. 6 will be described respectively in sequence in conjunction with FIG. 5, FIG. 7 and FIG. 8. However, it should be noted that although the portable device 1 shown in FIG. 5 is described as an example hereinafter to explain the method of switching button functions disclosed in the present invention, the method of switching button functions of the present invention shall not be limited to application only to the aforementioned portable device 1.

First, in step S601: detecting whether a portable device is connected to a display.

In the second embodiment of the present invention, as in the aforementioned first embodiment, the first step in the method of switching button functions of the present invention is detecting whether the portable device 1 is connected to the display 90 through the processing unit 40.

Then, in step S602: determining whether functions of the buttons can be switched according to whether a button information is received.

Figure 7:
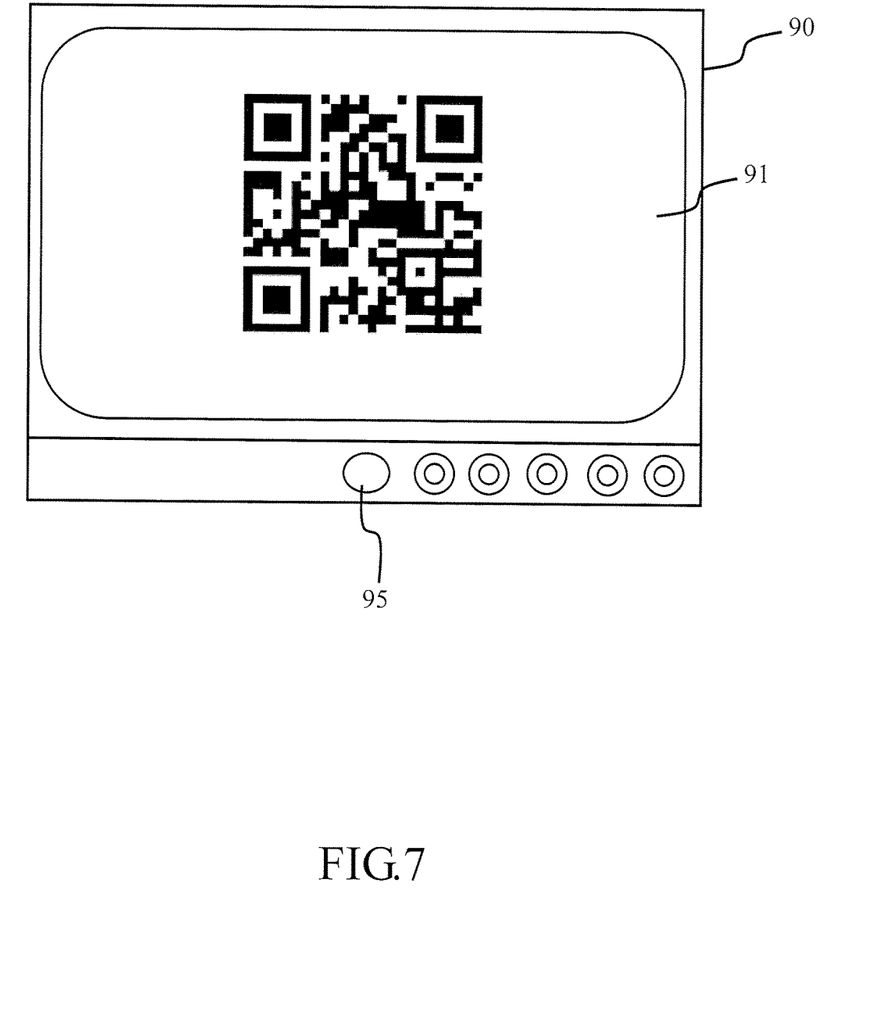
FIG. 7 is a view showing a QR code displayed on a display.

In the second embodiment of the present invention, after the display 90 is connected to the portable device 1, if the display 90 supports switching of the button functions, a QR code will be output by the control unit 95 of the display 90 through the display unit 91; that is, a QR code will be displayed on the display 90 (as shown in FIG. 7). The displayed QR code contains button information stored in the memory module 94. Conversely, if the display 90 connected to the portable device 1 does not support switching of the button functions, the QR code will not be displayed on the display 90.

When the display 90 displays the QR code and a user scans the QR code with the scanning module 50 of the portable device 1, the processing unit 40 receives the button information and determines the display 90 connected to the portable device 1 supports switching of the button functions. Conversely, if the portable device 1 is connected to the display 90 for a period of time but the processing unit 40 fails to receive the button information (possibly because the display 90 did not display the QR code or the user did not scan the QR code), it is determined that the display 90 does not support switching of the button functions. In other words, in the second embodiment of the present invention, the button information is received via the scanning module 50 scanning the QR code, which is different from the acquisition method described in the aforementioned first embodiment. It should be noted herein that the scanned QR code or bar code is not limited to being displayed on the display 90 but can also be printed on paper provided by a manufacturer of the display 90 or on the remote control 70 (preferably provided in a sticker form), or otherwise provided.

In step 603: pairing each of the buttons with operable functions provided by the portable device, and storing a pairing information of each of the buttons and each of the operable functions provided by the portable device after the pairing is completed.

The difference between the second embodiment and the aforementioned first embodiment of the present invention is that after receiving the button information, the processing unit 40 of the portable device 1 does not provide the setting interface 80 but automatically pairs each of the buttons B1-B12 with each of the operable functions provided by the portable device 1 and, after the pairing is completed, stores the pairing information of each of the buttons B1-B12 with each of the operable functions provided by the portable device 1.

Figure 8:
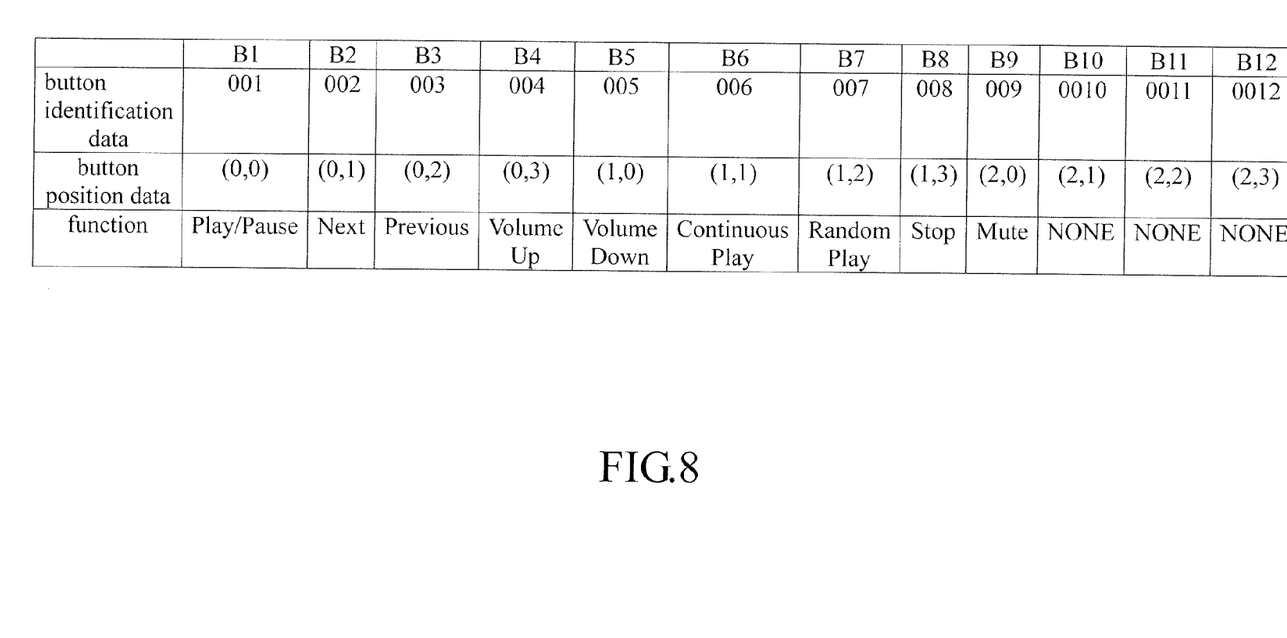
FIG. 8 shows another pairing information of control buttons and functions provided by a video player.

The specific implementation of automatic pairing is that the processing unit 40 pairs the operable functions provided by an application with each of the buttons B1-B12 in accordance with a preset function sequence. As shown in FIG. 8, for example, the most frequently used default function of a media player is "Pause/Play". Thus, the button B1 is paired with the "Pause/Play" function of the media player during automatic pairing. The second most frequently used default function of the media player is "Next". Thus, the button B2 is paired with the "Next" function of the media player during automatic pairing, and so forth.

Also, if the number of the operable functions provided by the portable device 1 is greater than the number of the buttons B1-B12, the functions later in the sequence will not be paired. For example, as shown in the aforementioned FIG. 1 and FIG. 4B, since the number of the buttons is five, if the preset function sequence of functions of the media player is "Pause/Play"→"Next"→"Previous"→"Volume Up"→"Volume Down"→"Stop"→"Random Play"→"Continuous Play"→"Mute", the buttons B1-B5 and the media player functions "Pause/Play", "Next", "Previous", "Volume Up", and "Volume Down" will be paired. The remaining functions "Random Play", "Continuous Play", "Stop" and "Mute" will not be paired.

In the second embodiment of the present invention, after the pairing between each of the buttons B1~B12 and each of the operable functions provided by the portable device 1 is completed, the processing unit 40 does not send the switch setting command to the display 90 but allows the user to manually switch the control state of the control unit 95. One of the specific implementations, but not limited thereto, is to allow the user to long-press the power switch button 95 on the display 90 for more than five seconds to input the switch setting command. That is, when the user presses the power switch button 95 for more than five seconds, the temporary data stored in the temporary area 951 will be changed, such that the control state of the control unit 95 is changed from the first control state to the second control state. Once the control state is switched, a control command generated by the user pressing each of the buttons B1-B12 will be sent to the portable device 1, such that the portable device 1 can perform one of the operable functions provided by the portable device 1 and paired with one of the buttons B1-B12 according to the control command and the pairing information (the specific implementation is the same with the first embodiment, and thus will not be repeated herein).

It is obvious from the explanation of the first and second embodiments that the pairing of the functions provided by the portable device 1 and the button information enables a control command generated by one of the buttons B1-B12 to control the portable device 1 to perform a function paired with the button when the control command is sent to the portable device 1, such that the user can control the portable device 1 by operating the buttons B1-B12.

As described above, the objective, means, and effects of the present invention are all different from features of the prior art. It should be noted that the described embodiments are merely illustrative and exemplary, and that various changes and modifications may be made to the described embodiments without departing from the scope of the invention as disposed by the appended claims.

What is claimed is:

1. A method of switching button functions used for switching a function of at least one button used to operate a display when a portable device is signal-connected to the display, and the display comprises a display unit and a control unit which has a first control state and a second control state, wherein when the control unit performs the first control state, a control command generated by the at least one button is used for adjusting output of the display unit, the method of switching button functions comprising steps of:
   detecting whether the portable device is signal-connected to the display;
   whenever yes, determining whether the function of the at least one button can be switched according to whether a button information is received;
   whenever yes, pairing the at least one button with an operable function provided by the portable device;
   storing a pairing information of the at least one button and the operable function provided by the portable device; and
   sending a switch setting command to the display to switch a control state of the control unit from the first control state to the second control state, such that the control unit sends a control command generated by the at least one button to the portable device when the control unit performs the second control state.

2. The method as claimed in claim 1, further comprising the following steps:
   receiving the control command generated by the at least one button; and
   performing an operable function provided by the portable device and paired with the at least one button according to the control command and the pairing information.

3. The method as claimed in claim 1, wherein before pairing of the at least one button with the operable function provided by the portable device, the method further comprises the following step:
   providing a setting interface displayed on a screen of the portable device, such that a user selects and sets the pairing information via the setting interface.

4. The method as claimed in claim 3, wherein the button information comprises a button location data which is displayed on the setting interface; the button location data allows the user to identify a position of the at least one button when selecting and setting the pairing information.

5. The method as claimed in claim 1, wherein button information is sent to the portable device from the display after the portable device is signal-connected to the display.

6. The method as claimed in claim 1, wherein the portable device comprises a scanning module; button information is obtained by the scanning module scanning a bar code.

7. The method as claimed in claim 6, wherein the scanning module is a camera and the bar code is a QR code.

8. The method as claimed in claim 6, wherein the bar code is displayed by the display.

9. The method as claimed in claim 1, wherein the at least one button is on a remote control used for controlling the display.

10. A portable device used for switching a function of at least one button used to operate a display when the portable device is connected to the display, and the display comprises a display unit and a control unit which has a first control state and a second control state, wherein when the control unit performs the first control state, a control command generated by the at least one button is used for adjusting output of the display unit, the portable device comprising:
   a memory;
   a communication module, which is used to signal-connect to the display; and
   a processing unit, which is electrically connected to the memory and the communication module for determining whether the communication module is signal-connected to the display, and for determining whether the function of the at least one button can be switched according to whether a button information is received when the communication module is signal-connected to the display; if when the function of the at least one button can be switched, the processing unit is further used for pairing the at least one button with an operable function provided by the portable device, and storing a pairing information of the at least one button and the operable function provided by the portable device into the memory after the pairing is completed; the processing unit is further used to send a switch setting command to the display to switch a control state of the control unit from the first control state to the second control state, such that the control unit sends a control command generated by the at least one button to the portable device when the control unit performs the second control state.

11. The portable device as claimed in claim 10, wherein the processing unit is further used to receive the control command generated by the at least one button, and performing an operable function provided by the portable device and paired with the at least one button according to the control command and the pairing information after the control command is received.

12. The portable device as claimed in claim 10, further comprising a screen; before pairing of the at least one button and the operable function provided by the portable device, the processing unit is further used for providing a setting interface displayed on the screen, such that a user selects and sets the pairing information via the setting interface.

13. The portable device as claimed in claim 12, wherein the button information comprises a button location data which is displayed on the setting interface; the button location data allows the user to identify a position of the at least one button when selecting and setting the pairing information.

14. The portable device as claimed in claim 10, wherein the button information is sent to the portable device from the display after the portable device is signal-connected to the display.

15. The portable device as claimed in claim 10, further comprising a scanning module; the button information is obtained by the scanning module scanning a bar code.

16. The portable device as claimed in claim 15, wherein the scanning module is a camera and the bar code is a QR code.

17. The portable device as claimed in claim 15, wherein the bar code is displayed on the display.

18. The portable device as claimed in claim 10, wherein the at least one button is on a remote control used for controlling the display.

19. A display, which is able to be signal-connected to a portable device and controlled by at least one button; the portable device is used for pairing the at least one button with an operable function provided by the portable device when the portable device is signal-connected to the display to set a pairing information of the at least one button and the operable function provided by the portable device, the display comprising:
   a display unit;
   a communication interface, which is used to signal-connect to the portable device; and
   a control unit, which is signal-connected to the at least one button, the display unit, and the communication interface, and has a first control state and a second control state; when the control unit is in the first control state, a control command generated by the at least one button is used for adjusting output of the display unit; when the control unit is in the second state, the control command generated by the at least one button is sent to the portable device by the control unit, such that the portable device performs the operable function provided by the portable device and paired with the at least one button according to the control command and the pairing information.

20. The display as claimed in claim 19, wherein when the communication interface is signal-connected to the portable device, the control unit sends a button information to the portable device via the communication interface.

21. The display as claimed in claim 19, wherein when the communication interface is signal-connected to the portable device, the control unit is used to control the display unit to output a bar code.

22. The display as claimed in claim 21, wherein the bar code is a QR code.

* * * * *